US007131865B2

(12) United States Patent
Tsai et al.

(10) Patent No.: US 7,131,865 B2
(45) Date of Patent: Nov. 7, 2006

(54) FIXING STRUCTURE FOR INSERTION MODULE

(75) Inventors: Ming Chih Tsai, Taoyuan Hsien (TW); Choo Soo Lim, Samutprakarn (TH)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/869,211

(22) Filed: Jun. 16, 2004

(65) Prior Publication Data

US 2005/0142935 A1 Jun. 30, 2005

(30) Foreign Application Priority Data

Dec. 26, 2003 (TW) .............................. 92137172 A

(51) Int. Cl.
*H01R 13/73* (2006.01)
*H02B 1/01* (2006.01)

(52) U.S. Cl. ...................................................... 439/557

(58) Field of Classification Search ................ 439/552, 439/557, 565, 567

See application file for complete search history.

(56) References Cited

U.S. PATENT DOCUMENTS 3,824,524 A * 7/1974 Glover ........................ 439/282
5,015,203 A * 5/1991 Furrow ........................ 439/535
6,648,681 B1 * 11/2003 Ushiro et al. ............... 439/557

* cited by examiner

*Primary Examiner*—James R. Harvey

(57) ABSTRACT

A fixing structure for the insertion module is disclosed. The fixing structure for the insertion module comprises at least a hook piece disposed on one side of the insertion module, and at least a support portion disposed on the hook piece. Thereby, the insertion module is fixed in an opening of a computer casing firmly via the hook piece and the support portion.

18 Claims, 7 Drawing Sheets

FIXING STRUCTURE FOR INSERTION MODULE

FIELD OF THE INVENTION

This invention relates to a fixing structure for an insertion module, and more particularly to a fixing structure for an electronic device, such as a plug or a socket.

BACKGROUND OF THE INVENTION

With the technology progress, the essential equipments of computer are increasing, and thus how to firmly assemble various electronic devices on the computer equipments is a problem that needs to be solved for the researchers of the computer products. Generally speaking, the plug or socket is an essential electronic device which needs to be assembled on the computer casing to facilitate its utilization for the users. Therefore, there usually exist plural openings for receiving these plugs or sockets, and these electronic devices which are assembled in the openings are generally called insertion modules.

Please refer to FIGS. 1(*a*) and (*b*), which show the structure diagrams of the insertion module and the computer casing before and after assembling according to the prior art. As shown in FIG. 1(*a*), the computer casing 1 has an opening 11 for receiving an insertion module 12 (can be a plug or a socket), and the insertion module 12 has elastic pieces 121 respectively on the upper side and the lower side. As shown in FIG. 1(*b*), after the insertion module 12 is assembled in the opening 11 of the computer casing 1, the computer casing 1 would be positioned in the gap between the insertion module 12 and the elastic pieces 121. Thereby, the elastic pieces 121 can prop up the computer casing 1, so that the insertion module 12 can be fixed in the opening 11 of the computer casing 1.

However, such design of the prior art has many disadvantages. As shown in FIG. 1(*b*), the size of the opening 11 of the computer casing 1 is usually slightly bigger than that of the main body of the insertion module 12 to facilitate the assembling of the insertion module 12 and the computer casing 1, and avoid the elastic piece 121 from losing its elastic recovery due to overpressing the elastic piece during the assembling process. In that event, after the assembling, there would exist a small gap between the insertion module 12 and the computer casing 1. Although the insertion module 12 has been fixed in the opening 11, when the user unintentionally pulls the insertion module 12, it is unavoidable to cause the shaking of the insertion module 12, and after a while, the elastic recovery of the elastic piece 121 would be weakened, or the size of the opening 11 would be changed, so that the insertion module 12 would not be firmly fixed on the computer casing 1 any more. In particular, if the user inadvertently exerts force on the insertion module 12 at an inclined angle, the insertion module 12 would be displaced due to the vertical component of force, as shown in FIG. 2, which is a schematic diagram showing the displacement of the insertion module caused by an inclined force according to the prior art. When the opening 11 is getting bigger and the elastic recovery of the elastic piece 121 is getting weaker, as long as the insertion module 12 is inadvertently touched, it would be displaced and inclined or even fall off, such that the insertion module 12 cannot be firmly positioned on the computer casing 1, which causes a serious defect of assembling for the electronic device.

Therefore, there is a need to provide a fixing structure for an insertion module which can overcome the disadvantages of the prior art as described above.

SUMMARY OF THE INVENTION

It is an object of the present invention to provide a fixing structure for an insertion module, which can more firmly fix the insertion module in the opening of the computer casing to prevent the insertion module from falling off or shaking.

In accordance with an aspect of the present invention, the fixing structure for the insertion module comprises at least a hook piece disposed on one side of the insertion module, and at least a support portion disposed on the hook piece. Thereby, the insertion module is fixed in an opening firmly via the hook piece and the support portion.

In an embodiment, the hook piece and the support portion are formed integrally.

In an embodiment, the sides of the hook piece are arc-shaped or sawtooth-shaped.

In an embodiment, the hook piece is shaped as a butterfly.

In an embodiment, the hook piece has two wings opposite to each other. The wings have curved surfaces raising upwardly or downwardly at a specific angle, and the ends of the wings are rounded.

In an embodiment, the support portion is disposed between the two wings.

In an embodiment, the support portion is ⊓-shaped and forms a planar top surface thereon.

In an embodiment, the insertion module is a plug or a socket.

In accordance with another aspect of the present invention, an insertion module is further provided. The insertion module comprises a main body and a fixing structure. The fixing structure comprises at least a hook piece disposed on one side of the main body, and at least a support portion disposed on the hook piece. Thereby the insertion module is fixed in an opening of a computer casing firmly via the hook piece and the support portion.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 4(*b*) shows a partial enlargement of the contact area of the computer casing and the insertion module in FIG. 4(*a*);

FIG. 4(*c*) shows a top view of the embodiment of FIG. 4(*a*);

DETAILED DESCRIPTION OF THE PREFERRED EMBODIMENT

The present invention relates to a fixing structure for an insertion module. The present techniques are illustrated with the following embodiments for a fixing structure for a plug, but the insertion module which is applicable to the present techniques is not limited to the plug. Any insertion module which is applicable to the following techniques, such as a socket or a connector, is incorporated herein for reference.

Figure 1A:
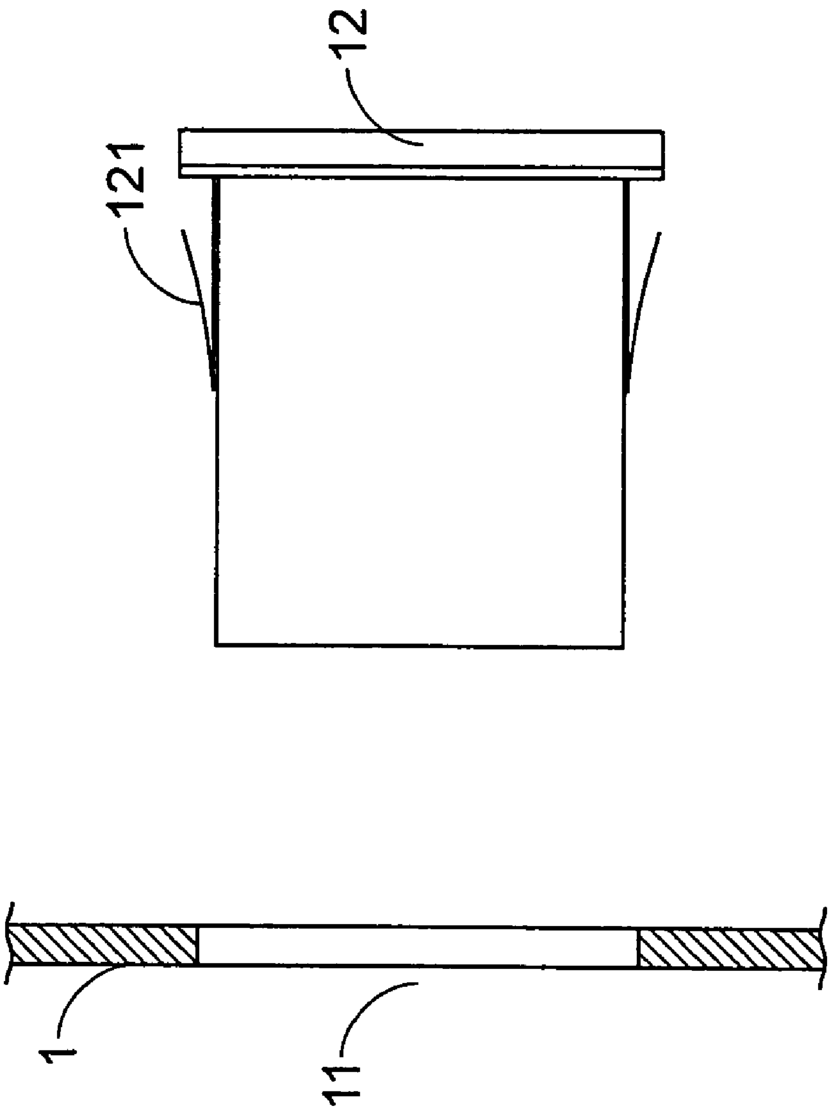
Fig. 1(a) (Prior Art)
FIGS. 1(*a*) and (*b*) show the structure diagrams of the insertion module and the computer casing before and after assembling according to the prior art.
Figure 1B:
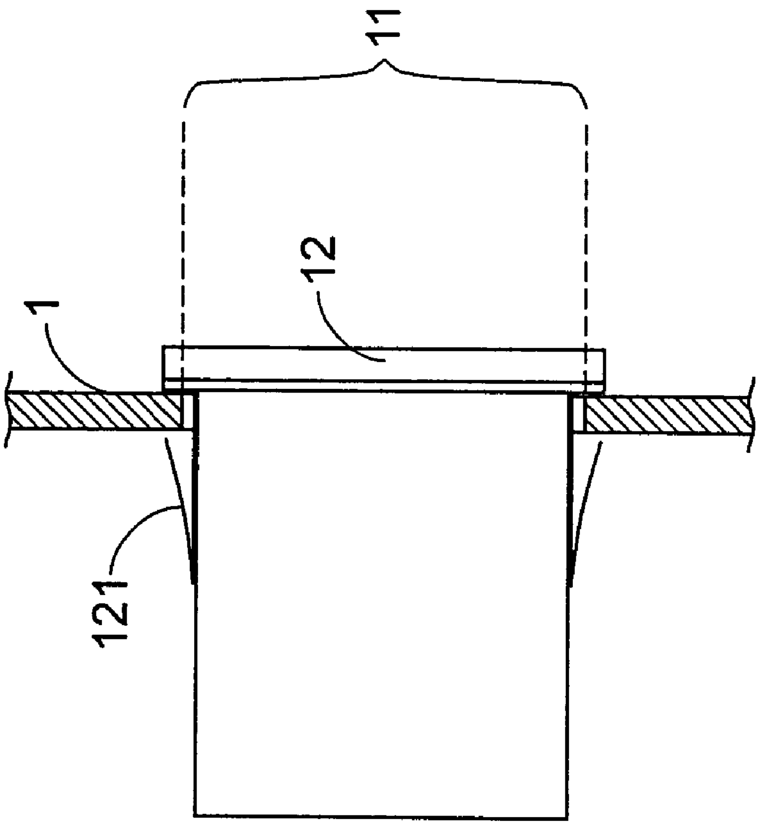
Fig. 1(b) (Prior Art)
Figure 2:
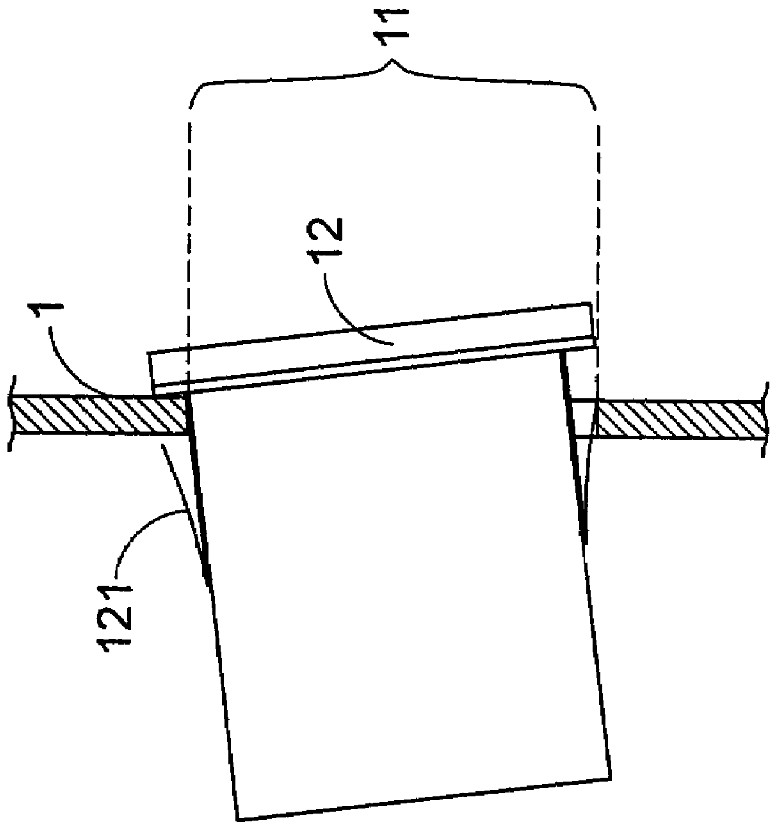
Fig. 2 (Prior Art)
FIG. 2 is a schematic diagram showing the displacement of the insertion module caused by an inclined force according to the prior art.
Figure 3:
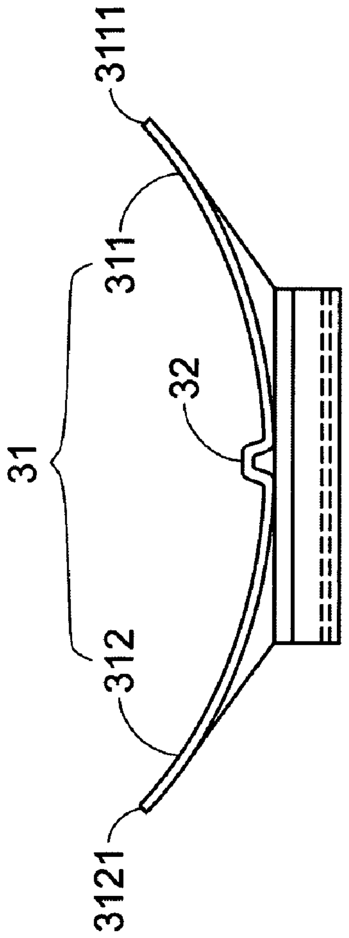
FIGS. 3(*a*) and (*b*) show a top view and a front view of the fixing structure for the insertion module according to a preferred embodiment of the present invention.
Figure 3:
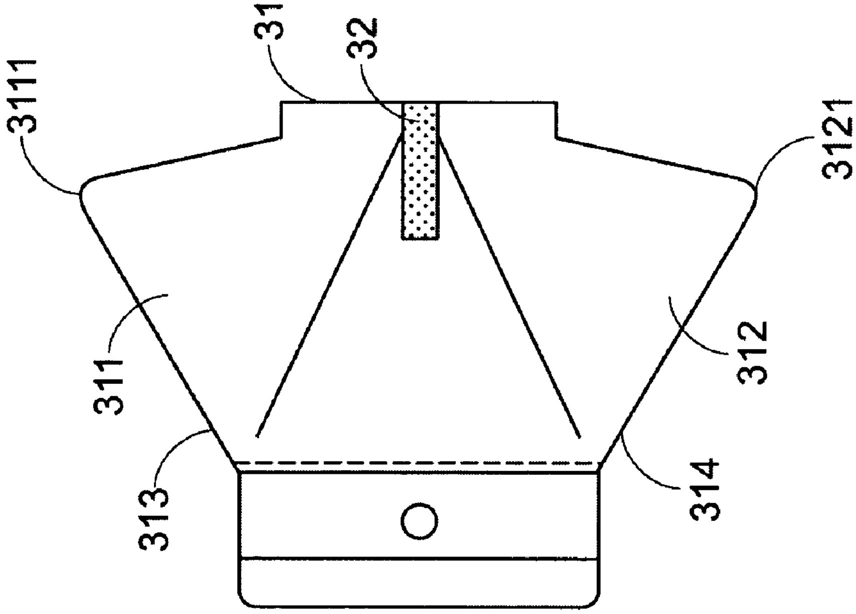

Please refer to FIGS. 3(*a*) and (*b*), which show a top view and a front view of the fixing structure for the insertion module according to a preferred embodiment of the present invention. As shown in FIG. 3(*a*), the fixing structure for the insertion module mainly includes at least a hook piece 31 and at least a support portion 32. The hook piece 31 has two wings 311 and 312 opposite to each other and the wings 311 and 312 have curved surfaces raising upwardly a specific angle, so that the hook piece 31 is shaped like a butterfly. The ends 3111 and 3121 of the wings 311 and 312 are rounded to prevent the computer casing (not shown) or the user from being scraped and damaged (if the ends of the wings are sharp, the computer casing and the user might be scraped and damaged). In addition, the sides 313 and 314 of the hook piece 31 are arc-shaped; when the insertion module is pushed into the opening of the computer casing, it can be pushed more smoothly and positioned in the opening since the hook piece 31 thereof has the arc-shaped sides 313 and 314. The support portion 32 is disposed between the two wings 311 and 312 of the hook piece 31. As shown in FIG. 3(*b*), the support portion 32 is in a ⊓-shape, so it has a specific height and forms a planar top surface thereon (the dotted area as shown in FIG. 3(*a*)). When the insertion module is pushed into the opening of the computer casing, the planar top surface of the support portion 32 provides more contact area to prop up the computer casing, so that the gap between the computer casing and the insertion module can be reduced, and even more, the distance between the computer casing and the insertion module can be reduced to zero. On the other hand, since the support portion 32 has a specific height, when assembling the insertion module and the computer casing, it does not need to press the hook piece 31 deeply to complete the assembling. Therefore, the elasticity or elastic recovery of the hook piece 31 can be maintained.

Figure 4:
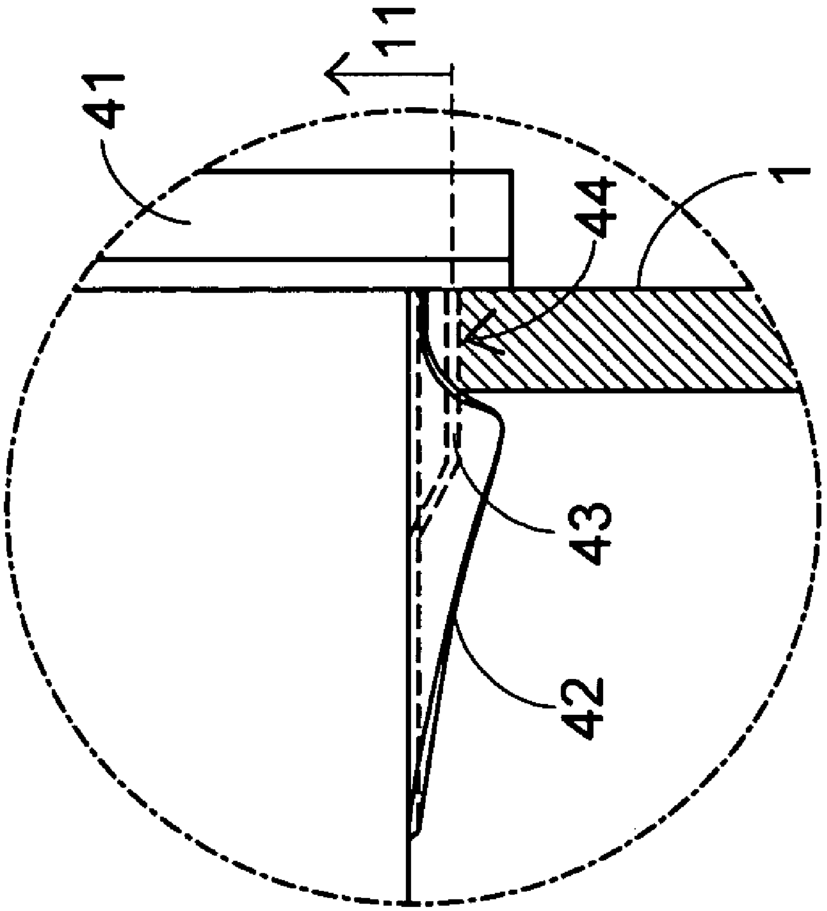
FIG. 4(*a*) shows a side view of the assembly structure of the insertion module and the computer casing according to a preferred embodiment of the present invention.
Figure 4:
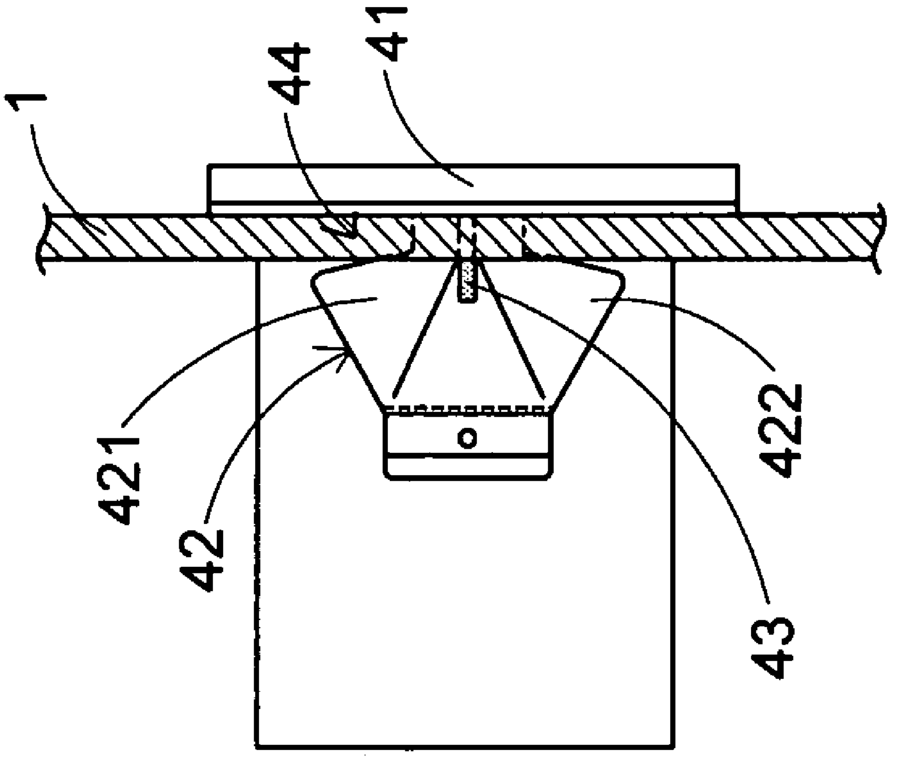

Please refer to FIGS. 4(*a*) and 4(*c*), which show a side view and a top view of the assembly structure of the insertion module and the computer casing according to a preferred embodiment of the present invention. As shown in FIG. 4(*a*), the main body of the insertion module 41 has two hook pieces 42 respectively at the upper side and the lower side thereof. The hook piece 42 has two wings 421 and 422 as shown in FIG. 4(*c*), and a support portion 43 disposed in the middle between the two wings 421 and 422. When assembling, the insertion module 41 is pushed into the opening 11 of the computer casing 1 along the arc-shaped sides, and the computer casing 1 is positioned in a gap 44 between the two wings 421 and 422 of the hook piece 42 and the insertion module 41; meanwhile, the two wings 421 and 422 of the hook piece 42 are both located inside said computer casing 1. The wings of the hook piece 42 have curved surfaces raising upwardly a specific angle and are located a small distance from the surface of the insertion module 41, so the hook piece 42 can prop up the computer casing 1. Therefore, the insertion module 41 can be fixed in the opening 11 of the computer casing 1 and the movement or shaking of the insertion module 41 can be avoided.

Please refer to FIG. 4(*b*), which shows a partial enlargement of the contact area of the computer casing and the insertion module in FIG. 4(*a*). After the insertion module 41 is assembled in the opening 11 of the computer casing 1, the computer casing 1 and the support portion 43 would exactly prop up each other. When there is any external force applied to the insertion module 41, the hook piece 42 can prevent the insertion module 41 from falling off, and the support portion 43 can absorb the downward pressure from the computer casing 1 to retain the position of the insertion module 41. More particularly, since the support portion 43 forms a planar top surface thereon (as shown in FIG. 3(*a*) by support portion 32), when the computer casing 1 presses downwardly the support portion 43, the two wings of the hook piece 42 would be further elevated, which ensures that the computer casing 1 is completely blocked by the hook piece 42 so as to prevent and avoid the insertion module 41 from falling off or shaking.

Figure 6:
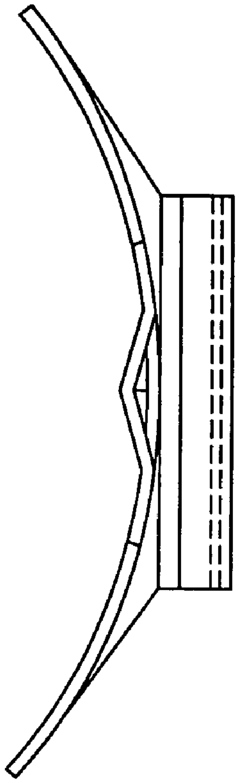
FIG. 6 shows a front view of the fixing structure for the insertion module according to a third preferred embodiment of the present invention.
Figure 5:
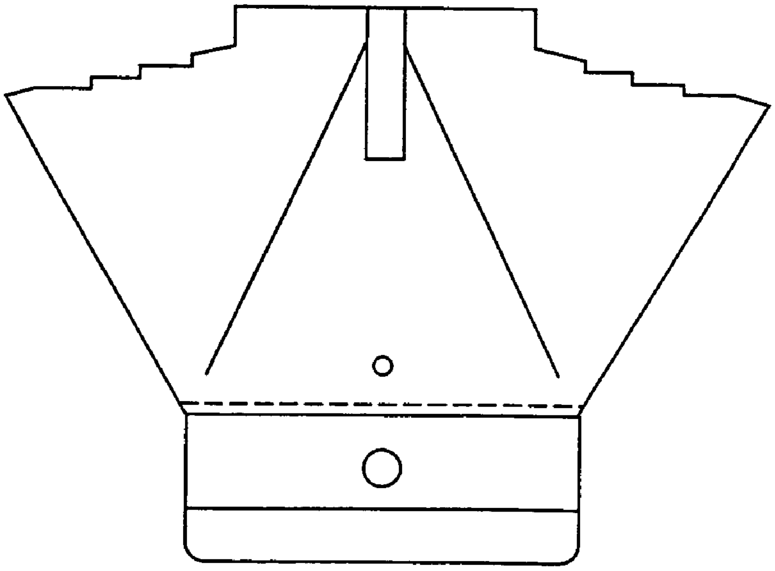
FIG. 5 shows a top view of the fixing structure for the insertion module according to a second preferred embodiment of the present invention.

Certainly, in the above-mentioned embodiments, the side shape of the hook piece of the fixing structure for the insertion module is not limited, and the shape and design of the support portion are not limited, either. Please refer to FIG. 5, which shows a top view of the fixing structure for the insertion module according to a second preferred embodiment of the present invention. As shown in FIG. 5, the sides of the hook piece of the fixing structure for the insertion module can be in a sawtooth shape. Via the edge difference of the sawtooth shape, when an external force is applied to the insertion module, the hook piece can block the movement of the insertion module, and part of the collision stress can be absorbed by the edge difference to form a buffering effect. Moreover, please refer to FIG. 6, which shows a front view of the fixing structure for the insertion module according to a third preferred embodiment of the present invention. As shown in FIG. 6, the support portion of the fixing structure for the insertion module can be shaped as a triangular pyramid, which can also be used to prop up the computer casing to prevent the insertion module from falling off or shaking. Additionally, except raising upwardly, the wings of the hook piece of the fixing structure for the insertion module can also be designed as any other form which can be used to block the movement of the insertion module, such as raising downwardly or in a wave shape.

In conclusion, since the fixing structure for the insertion module of the present invention includes the hook piece and the support portion, the insertion module can be assembled and fixed on the computer casing. Via the arc design of the hook piece, the insertion module can be assembled on the computer casing more easily and conveniently. In addition, due to the support portion, the hook piece would not be broken by the pressure from the computer casing easily. More important, the fixing structure for the insertion module of the present invention overcomes the disadvantages of the prior art that the insertion module is not easily fixed on and might fall off from the computer casing, and thus the present invention possesses the industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fixing structure for an insertion module to be fixed in an opening of a casing, comprising:

at least a hook piece disposed on one side of said insertion module, wherein said hook piece has two wings opposite to each other, said casing is positioned in a gap between said two wings and said insertion module, and said two wings are both located inside said casing; and at least a support portion disposed on said hook piece against said casing to reduce a gap between said casing and said insertion module;

thereby said insertion module is fixed in said opening firmly via said hook piece and said support portion.

2. The fixing structure for the insertion module according to claim 1 wherein said hook piece and said support portion are formed integrally.

3. The fixing structure for the insertion module according to claim 1 wherein the sides of said hook piece are arc-shaped or sawtooth-shaped.

4. The fixing structure for the insertion module according to claim 1 wherein said hook piece is shaped as a butterfly.

5. The fixing structure for the insertion module according to claim 1 wherein said wings have curved surfaces raising upwardly or downwardly a specific angle.

6. The fixing structure for the insertion module according to claim 1 wherein the ends of said wings are rounded.

7. The fixing structure for the insertion module according to claim 1 wherein said support portion is disposed between said two wings.

8. The fixing structure for the insertion module according to claim 1 wherein said support portion is ⊓-shaped and forms a planar top surface thereon.

9. The fixing structure for the insertion module according to claim 1 wherein said insertion module is a plug or a socket.

10. An insertion module, comprising:

a main body; and a fixing structure to be fixed in an opening of a casing, comprising:

at least a hook piece disposed on one side of said main body, wherein said hook piece has two wings opposite to each other, said casing is positioned in a gap between said two wings and said insertion module, and said two wings are both located inside said casing; and at least a support portion disposed on said hook piece against said casing to reduce a gap between said casing and said insertion module;

thereby said insertion module is fixed in said opening firmly via said hook piece and said support portion.

11. The insertion module according to claim 10 wherein said hook piece and said support portion are formed integrally.

12. The insertion module according to claim 10 wherein the sides of said hook piece are arc-shaped or sawtooth-shaped.

13. The insertion module according to claim 10 wherein said hook piece is shaped as a butterfly.

14. The insertion module according to claim 10 wherein said wings have curved surfaces raising upwardly or downwardly a specific angle.

15. The insertion module according to claim 10 wherein the ends of said wings are rounded.

16. The insertion module according to claim 10 wherein said support portion is disposed between said two wings.

17. The insertion module according to claim 10 wherein said support portion is ⊓-shaped and forms a planar top surface thereon.

18. The insertion module according to claim 10 wherein said insertion module is a plug or a socket.

* * * * *

UNITED STATES PATENT AND TRADEMARK OFFICE

CERTIFICATE OF CORRECTION

PATENT NO. : 7,131,865 B2
APPLICATION NO. : 10/869211
DATED : November 7, 2006
INVENTOR(S) : Ming Chih Tsai and Choo Soo Lim It is certified that error appears in the above-identified patent and that said Letters Patent is hereby corrected as shown below:

Title page

Item (73), Assignee: Should read, -- Delta Electronics Inc., and Delta Electronics (Thailand) Public Company Limited --.

Signed and Sealed this
Eighteenth Day of August, 2015

Michelle K. Lee
*Director of the United States Patent and Trademark Office*